United States Patent [19]
Brown

[11] 3,754,648
[45] Aug. 28, 1973

[54] FLUID FILTERING DEVICE

[75] Inventor: Carl A. Brown, Birmingham, Mich.

[73] Assignee: Parkin-Hannifin Corporation, Cleveland, Ohio

[22] Filed: Oct. 1, 1971

[21] Appl. No.: 185,583

[52] U.S. Cl. .................... 210/90, 210/131, 210/172, 210/DIG. 14
[51] Int. Cl. ............................................ B01d 35/14
[58] Field of Search ...................... 210/90, 131, 172, 210/DIG. 14

[56] References Cited
UNITED STATES PATENTS
3,441,138  4/1969  Rosaen et al. .................. 210/172 X
3,442,383  5/1969  Rosaen et al. .................. 210/131 X Primary Examiner—Samih N. Zaharna
Assistant Examiner—Richard W. Burks
Attorney—Gifford, Patalidis and Dumont

[57] ABSTRACT

A fluid filtering device in which the filter element can be changed without interrupting the operation of the device and which includes means for directing fluid around opposite ends of the filter element to operate as a bypass when the filter element becomes unduly clogged. The filtering device also is provided with an indicator housing portion mounted to the top plate of a fluid reservoir and a plurality of support rods extending downwardly into the reservoir to support a filter housing portion at a position below the level of the fluid in the reservoir. The filter housing portion has a chamber opening at the top and bottom of the housing portion and within which the filter element is removably supported for filtering fluid flowing from the chamber openings to an outlet passage which in one embodiment of the invention terminates in a boss that supports one end of an upright tubular member disposed in a spaced parallel arrangement with respect to the support rods. The opposite upper end of the tubular member is received in a boss of the indicator housing portion in such a manner that the tubular member is secured to the upper and lower bosses upon connection of the support rods to the filter housing portion. In another embodiment the housing portion is provided with an outlet port adapted for connection to an outlet conduit to extend through the top of the reservoir. In both embodiments the indicator housing portion mounts an indicating device operatively coupled to the filter element to provide a visual indication of the filtering condition of the filter element.

13 Claims, 4 Drawing Figures

INVENTOR
CARL A. BROWN

INVENTOR
CARL A. BROWN

FLUID FILTERING DEVICE

BACKGROUND OF THE INVENTION

I. Field of the Invention

The present invention relates to fluid filtering devices and more particularly to an improvement in the construction of fluid filtering devices of the type for filtering circulating oil as commonly used in industrial hydraulic systems and the like.

II. Description of the Prior Art

Hydraulic systems generally employ a fluid pump which draws fluid from a source of fluid supply, such as a reservoir, and delivers the fluid under pressure to a fluid user, such as a fluid motor, to operate the same, after which the fluid is returned to the reservoir for recirculation by the fluid pump. A common practice is to install a filtering device in the system between the source of fluid and the intake of the fluid pump so that dirt, grit and like foreign matter are removed from the fluid by a filter element within the filtering device to prevent the fouling of the pump and other components of the system. In these systems when the filter element becomes clogged with foreign matter, the filter element must be replaced, otherwise the system to which fluid is being supplied may receive less fluid than is desirable for the proper operation and protection of the components of the system.

In many of these systems, it is customary to mount the filtering device in the system reservoir below the normal operating level of the reservoir, such that fluid passes through the filter element from one side thereof to be filtered and then is directed from the filter element through a suitable outlet passageway to the system pump. The clogged filter element is preferably easily reached and removed from the filter device while the system continues to operate and without any undue labor or expenditure of time.

In prior systems, the filtering device has usually comprised a filter element supported below the level of the fluid within the reservoir by a tubular member which, in turn, is mounted at its upper end to the top wall of the reservoir. When it is desired to remove the filter element, an upper cap secured to the upper end of the tubular member is removed and the filter element is withdrawn upwardly through the tubular member while the system continues to operate and a clean filter element is inserted down through the tubular member to replace the previously removed filter element.

This arrangement has functioned in a very acceptable manner. However, in order to provide easy accessibility to the filter element, the tubular member has heretofore been thought to be necessary and this has in effect reduced the inlet area to the filter element. In addition, these filtering devices require substantial modification in order to be used within reservoirs of different sizes and depths. Therefore, it is desirable to provide a filtering device of this type in which the need for a tubular member to support the filter element below the level of the fluid within the reservoir is eliminated, and in which a new support means is provided, and in which the support means is interchangeable with similar support means of different sizes so that the basic filtering device may be used within reservoirs of various sizes.

SUMMARY OF THE INVENTION

The present invention, which will be described subsequently in greater detail, comprises a fluid filtering device having a first housing portion adapted to be mounted to the top of a reservoir and including a plurality of removable support rods extending downwardly into the reservoir to support a second housing within which a removable filter element is mounted. The second housing portion has a chamber opened at the top and bottom thereof defining inlet means for communicating the reservoir fluid to the filter element, while an outlet passage, communicating with the filter element, mounts one end of a tubular member, the opposite end of which extends upwardly to the first housing portion for connection thereto. The support rods secure the housing portions together and also serve to mount the tubular member in place.

The first housing portion has a cap which when removed permits removal of the filter element without interrupting the operation of the fluid system. When the filter element becomes unduly clogged, it will be automatically shifted to a position in which the fluid will be directed around opposite ends of the filter element to bypass the element.

It is therefore a primary object of the present invention to provide a fluid filtering device having an improved means for supporting a filter element below the fluid level of a reservoir and which supporting means are interchangeable with similar supporting means of various sizes so that the filtering device is adapted for use within reservoirs of different sizes.

Other objects, advantages, and applications of the present invention will become apparent to those skilled in the art of fluid filtering devices when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts, and in which.

DESCRIPTION OF THE PREFERRED EMBODIMENTS

Figure 1:
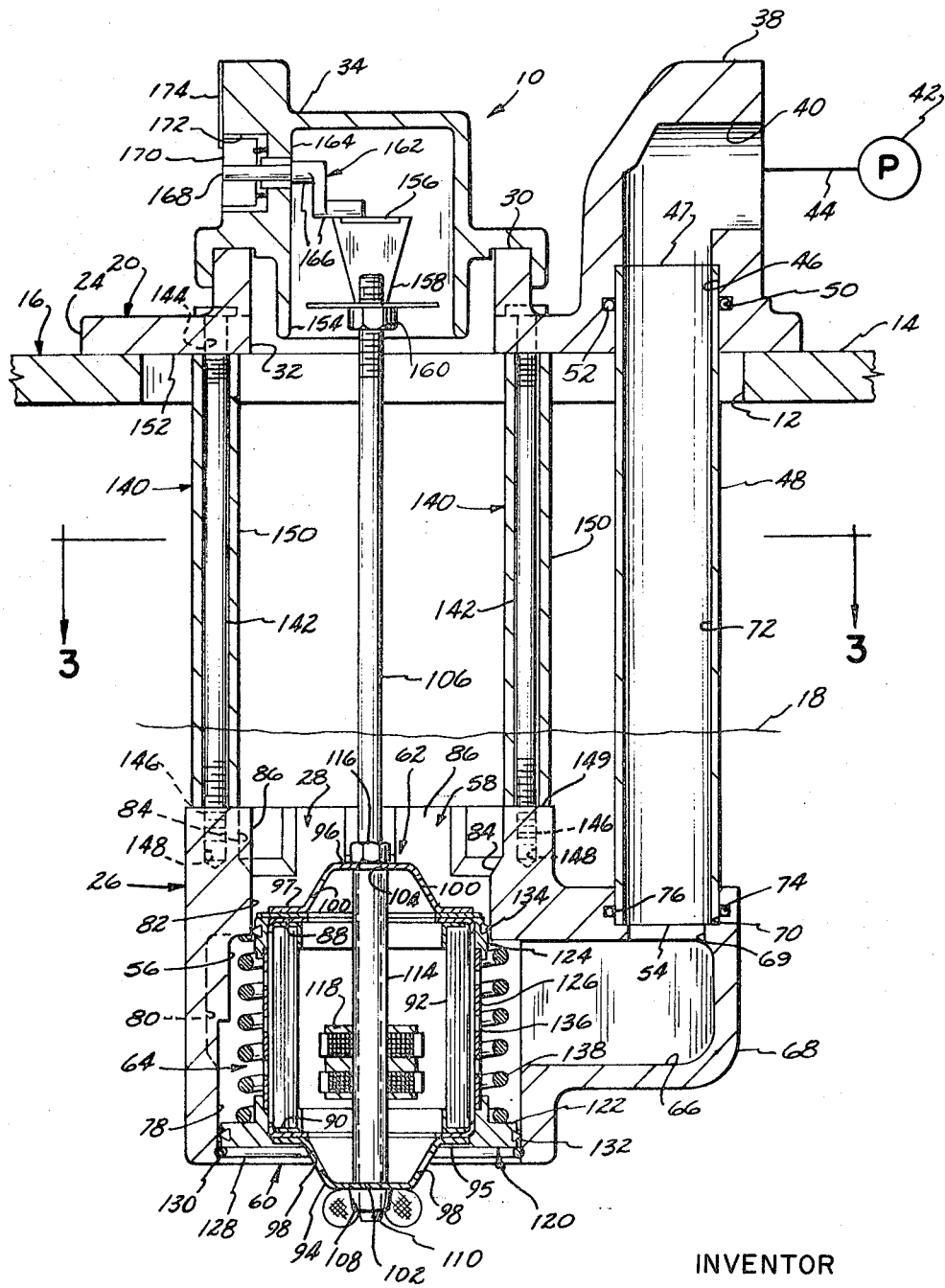
FIG. 1 is a longitudinal cross-sectional view of one preferred fluid filtering device mounted in a fluid reservoir and taken along line 1—1 of FIG. 2.

As can best be seen in FIG. 1 of the drawings, one preferred embodiment of the present invention comprises a fluid filtering device 10 adapted to be mounted in an opening 12 in the top wall 14 of a fluid reservoir 16 to extend vertically downwardly into the reservoir 16 below the level of the fluid 18 therein. The fluid filtering device 10 comprises an upper housing portion 20 encompassing the opening 12 and tightly secured to the upper surface of the top wall 14 of the reservoir 16 by a plurality of circumferentially spaced fastening members 22 (FIG. 2) which extend through an annular flange 24 of the upper housing portion 20 into threaded bores (not shown) in the top wall of the reservoir 16.

The fluid filtering device 10 further comprises a lower housing portion 26 supported by the upper housing portion 20 at a predetermined distance therefrom, with the lower housing portion 26 being normally well below the normal working level of the fluid 18 within the reservoir 16, such that an upper inlet 28 of the lower housing portion 26 is in constant fluid communication with the fluid 18 within the reservoir 16.

Still referring to FIG. 1, the upper housing 20 of the fluid filtering device 10 has a cylindrical boss 30 with a bore 32 extending completely through the upper housing 20 and opening into the reservoir 16. The bore 32 is normally covered by an indicator housing 34 mounted at the upper end of the cylindrical boss 30 and tightly secured thereto by a plurality of fastening members 36 (FIG. 2) which threadingly engage threaded bores (not shown) in the boss 30. The upper housing 20 further comprises an integrally formed right angle outlet boss 38, internally cored to form an outlet passage 40 adapted to be communicated to a system pump 42 via a conduit 44. The lower portion of the outlet passage 40 has a radially enlarged section 46 within which the upper end 47 of a tubular member 48 is snugly received. An annular recess 50 in the enlarged section 46 receives an O-ring seal 52 that functions to provide a fluid-tight seal in the conventional manner. The lower end 54 of the tubular member 48 is connected to the lower housing 26 in a manner to be described.

The lower housing 26 is internally cored to form a through bore 56 opening at the top and bottom portions of the lower housing 26 to respectively define fluid inlets 58 and 60 which communicate the fluid in reservoir 16 to the interior of a fluid filter assembly 62.

An intermediate portion of the lower housing bore 56 defines an intermediate fluid chamber 64 which is in constant fluid communication with an outlet passage 66 within a radially disposed boss 68. The passage 66 communicates with a port 69 having a radially enlarged section 70 which is vertically aligned with the enlarged section 46 of the boss 38 and which snugly receives the lower end 54 of the tubular member 48 such that fluid drawn from the intermediate chamber 64 is delivered to the pump 42 through outlet passage 66, the port 69, the interior 72 of the tubular member 48 and outlet passage 40. An annular recess 74 in the enlarged section 70 receives an O-ring 76 to provide a fluid-tight seal between the tubular member 48 and the boss 68.

The lower portion of the lower housing bore 56 forms an arcuate vertical wall section 78 having an annular recess 80 providing continuous fluid communication between the intermediate chamber 64 and the outlet passage 66. An annular section having a reduced inner diameter separates the intermediate chamber 64 from the upper inlet 58 and defines a second, short, arcuate vertical wall section 82, the lower end of which terminates in the intermediate chamber 64, while the upper portion of the vertical wall terminates at inclined portions 84, such that the upper portion of the bore 56 is enlarged with respect to the diameter of the arcuate vertical wall section 82. A plurality of ribs 86 are circumferentially spaced to extend inwardly from the inclined portions 84.

The arcuate wall section 82 and the ribs 84 cooperate with the lower arcuate vertical wall section 78 to provide a vertical guideway for the fluid filter assembly 62, which comprises a pair of annular flange elements 88 and 90 between which a substantially cylindrically shaped hollow filter element 92 is sandwiched. The fluid filter assembly 62 further comprises a lower member 94 having a flanged portion 95 abutting the lower surface of the flange member 90. An upper member 96, similar in construction to the lower member 94, includes a flange portion 95 abutting the upper surface of the flange member 88. The lower member 94 includes a plurality of annularly spaced openings 98 which permit fluid communication between the lower inlet 60 and the interior of the filter element 92. Similarly, the upper member 96 is provided with a plurality of annularly spaced openings 100 which permit fluid communication between the upper inlet 58 and the interior of the filter element 92. Thus, the upper and lower inlets 58 and 60 both provide communication between the fluid reservoir 16 and the interior of the filter element 92.

Still referring to FIG. 1, the lower member 94 and the upper member 96 are respectively provided with axially aligned openings 102 and 104 which are preferably formed along the axis of the filter element 92 and through which a vertically disposed rod 106 extends a sufficient distance to permit a lock nut 108 to be attached to the threaded end 110 to secure the upper and lower members to the filter element 92. A sleeve member 114, between the opposing inner surfaces of the upper and lower members, and a second lock nut 116 on the threaded portion of the rod 106 and above the upper member 96 insures a secure attachment of the members to the rod 106 and the filter element 92. The sleeve member 114 carries a plurality of magnets 118 which function to attract magnetic particles in the reservoir fluid and to thereby remove the particles from the system.

The fluid filter assembly 62 also includes a substantially cylindrically shaped sealing element 120 which preferably comprises a radially extending flange 122 proximate the lower flange element 90, a substantially axially extending flange 124 adjacent the upper flange element 88 and a cylindrical member 126 joining the flanges 122 and 124. The bottom portion of the outermost end of the flange 122 is adapted to be seated on the top of a retainer ring 128 disposed within an annular groove 130 formed in the arcuate wall 78, which retainer ring 128 limits the downward movement of the fluid filter assembly 62. The flange 122 preferably has an outer diameter corresponding to the inner diameter of the arcuate wall 78 and carries a piston ring 132 which slidably engages the arcuate wall 78 in a fluid-sealing relationship, while the flange 124 has an outer diameter corresponding to the inner diameter of the vertical wall 82 and is likewise provided with a piston ring 134 which slidably engages the wall 82 in a fluid-sealing relationship.

The cylindrical member 126 is provided with a plurality of annularly and axially spaced apertures 136 to permit unrestricted fluid flow between the outer surface of the filter element 92 and the intermediate chamber 64 which as heretofore indicated communicates directly with the outlet passage 66.

During normal operation, it is desired that the filter assembly 62 be positioned so that the flange 122 is normally seated against the retainer ring 128. This is accomplished by means of a coil spring 138 disposed between the underside of the vertical wall 82 and the upper surface of the radially extending flange 122 so as to normally bias the filter assembly 62 toward the seated position.

The lower housing 26 is supported by the upper housing 20 by means of a plurality of vertically disposed, annularly spaced, support rods 140, each of which comprises an elongated bolt 142 extending through a bore 144 formed in the upper housing 20 and downwardly with the threaded end 146 of each bolt 142 engaging one of a plurality of threaded bores 148 circumferentially spaced around the inlet 58 in the upper surface 149 of the lower housing 26. Each of the elongated bolts 142 extends through a spacer sleeve 150, the upper surface of which abuts the bottom surface 152 of the upper housing 20, while the lower surface of each spacer sleeve 150 abuts the upper surface 149 of the lower housing 26 so that when the bolts 142 are threaded into their respective threaded bores 148 in the lower housing 26, the lower housing 26 is fixedly attached to the upper housing 20 at a distance determined by the length of the spacers 150 and threaded bolts 142.

At the same time as the threaded bolts 142 engage their respective threaded bores 148 in the upper surface 149 of the lower housing 26, the tubular member 48 is securely retained at its opposite ends 47 and 54 within the outlet boss enlarged sections 46 and 70, respectively, and no additional securing means is necessary to secure the tubular member 48 in an operative position.

The support rods 140 and the tubular member 48 (which is spaced from and disposed along an axis parallel to the axes of the support rods 140) may each be interchanged with similar support rods and tubular members of different lengths, so that the basic upper and lower housings of the filtering device may be used in fluid reservoirs of different sizes. In this way, lower housing 20 may be positioned at any distance from the upper housing and thus the top wall 14 of the reservoir 16 simply by using support rods 140 and a tubular member 48 having a longitudinal length corresponding to the desired predetermined distance for each particular reservoir.

The indicator housing 34 which closes off the upper end of the bore 32, is removably secured thereto by the threaded fastening members 36 and preferably comprises an inwardly, downwardly extending cylindrical section 154 encompassing the upper end of the rod 106. An inverted truncated-shaped knob 156 carried on a threaded end 158 of the rod 106 is locked thereon by a nut 160. The upper end of the knob 156 is adjusted to engage an actuating pin 162 which is horizontally journaled for rotation in a boss portion 164 of the indicator housing 34. The inner end of the actuating pin 162 is provided with a pair of right angle bends 166 so that a vertical movement of the knob 156 produces a rotation of the actuating pin 162. The outer end 168 of the actuating pin 162 supports a pointer element 170 disposed in a recessed portion 172 of the boss 164. The pointer element 170 points to suitable indicia (not shown) provided on an exterior indicator plate 174 to indicate the filtering condition of the filter element 92, all of which will become more apparent as the description proceeds.

As the invention has thus far been described, fluid is normally drawn from the reservoir 16 through the top and bottom inlets 58 and 60 into the interior of the filter element 92. The fluid then flows radially through the filter element 92 and into the intermediate chamber 64, through the outlet passage 66, through the interior 72 of the tubular member 48, through the outlet boss passage 40 in the upper housing, and to the pump 42 via conduit 44. The pump 42 is adapted to deliver pressure fluid to a fluid user (not shown) which then returns the used fluid to the reservoir 16.

As the filter element 92 becomes clogged, it produces an increase in the pressure at the lower inlet 60 side of the filter element 92, resulting in a pressure differential between the inlet and the outlet of the device. The increased inlet pressure acts against the flange 122 to urge the entire filter assembly 62 in an upward axial direction, while the pressure of fluid within the intermediate chamber 64 of the outlet side acts against the inner side of the flange 122 to oppose the upward axial movement of the filter assembly 62. As the pressure differential increases, the resultant force acting on the filter assembly 62 gradually increases to the point where it overcomes the normally downwardly directed force of the spring 138, so that the filter assembly 62 including the sealing element 120 is carried axially upwardly. The spring 138 is chosen of a sufficient thickness to correspond to a predetermined clogged condition of the filter element 92, such that when the filter element 92 reaches such a clogged condition the filter assembly 62 will have risen vertically a sufficient distance for the sealing element flanges 122 and 124 to simultaneously clear the top portions of the walls 78 and 82, respectively, thereby permitting direct fluid flow from the upper and lower inlets 58 and 60 into the intermediate chamber 64. In this operating position of the device, the fluid from the reservoir 16 will flow around the exterior of the filter element 92 and directly into the outlet passage 66, thus bypassing the filter element.

As the filter assembly 62 moves from the filtering position to the bypass position, the upward movement of the rod 106 will cause the knob 156 to produce a rotation of the actuating pin 162 and the pointer element 170. Since the degree of rotation of the actuating pin 162 is associated with the upward axial movement of the rod 106 and therefore the condition of the filter assembly 62, a visual indication of the filtering condition of the filter element 92 may be had by an attendant.

When the filter element 92 becomes clogged to a degree that fluid is bypassing the filter element 92, it is necessary that the filter element 92 be removed for the purpose of either cleaning or replacement of the same. This may be accomplished while the fluid system continues to operate by removing the indicator housing 34 from the cylindrical boss 30 and grasping the knob 156 to pull the filter element 92 vertically upwardly, separating the filter element 92 from the cylindrically shaped sealing element 120. The filter element 62 is pulled vertically upwardly between each of the downwardly extending support rods 140 and externally of the upper housing 20 through the bore 32. Thus, removal of the filter element is accomplished by simply lifting the filter element 92 from an active filtering engagement with the fluid within the lower housing 26. A clean filter element 92 is inserted between the annular flange members 94 and 98 and reinserted within the sealing element 120 in the reverse manner in which it was withdrawn.

Figure 2:
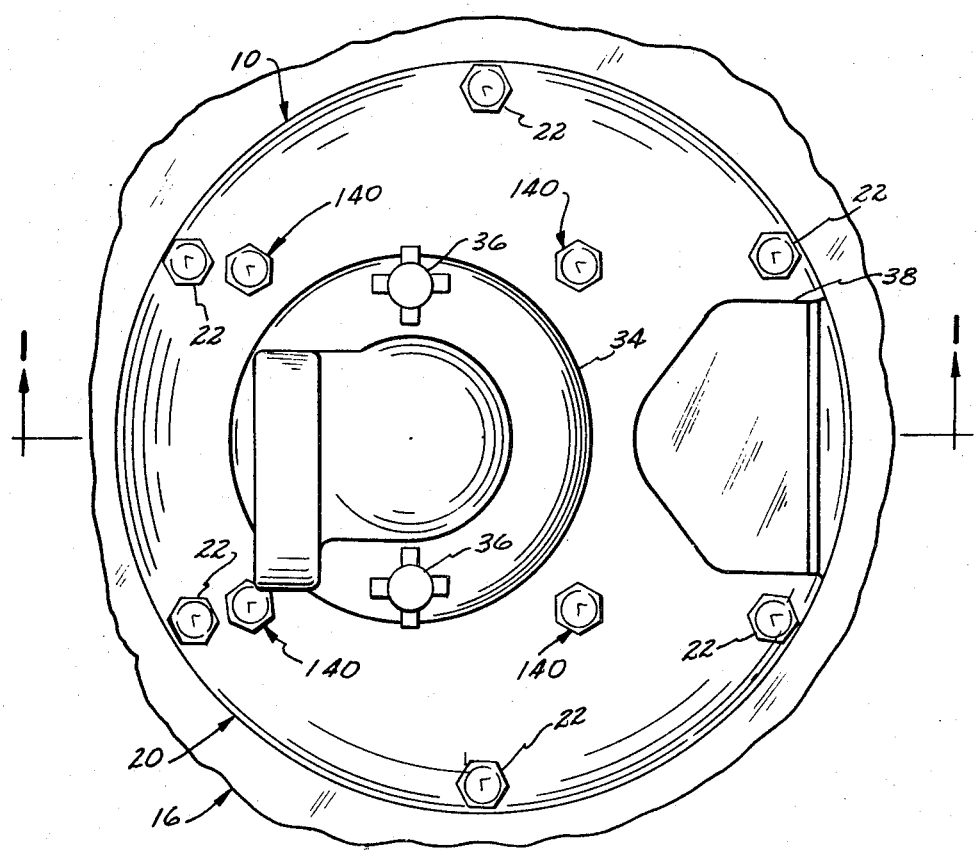
FIG. 2 is a fragmentary top plan view of the reservoir and the fluid filtering device illustrated in FIG. 1.
Figure 3:
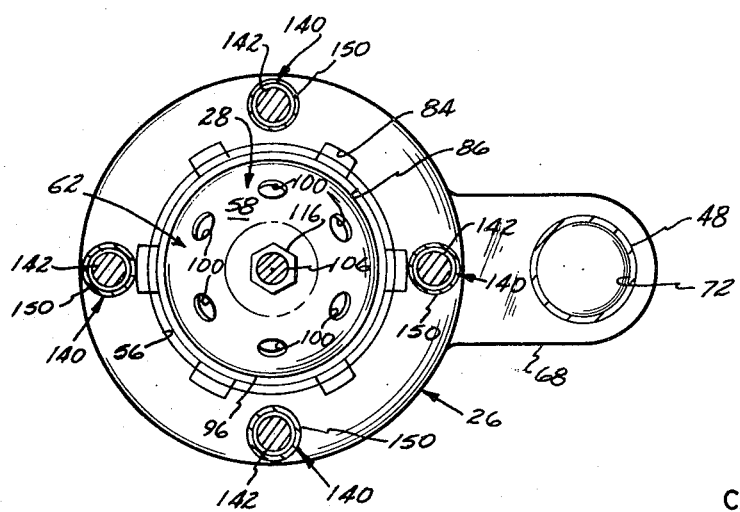
FIG. 3 is a cross-sectional view of the fluid filtering device taken along line 3—3 of FIG. 1.
Figure 4:
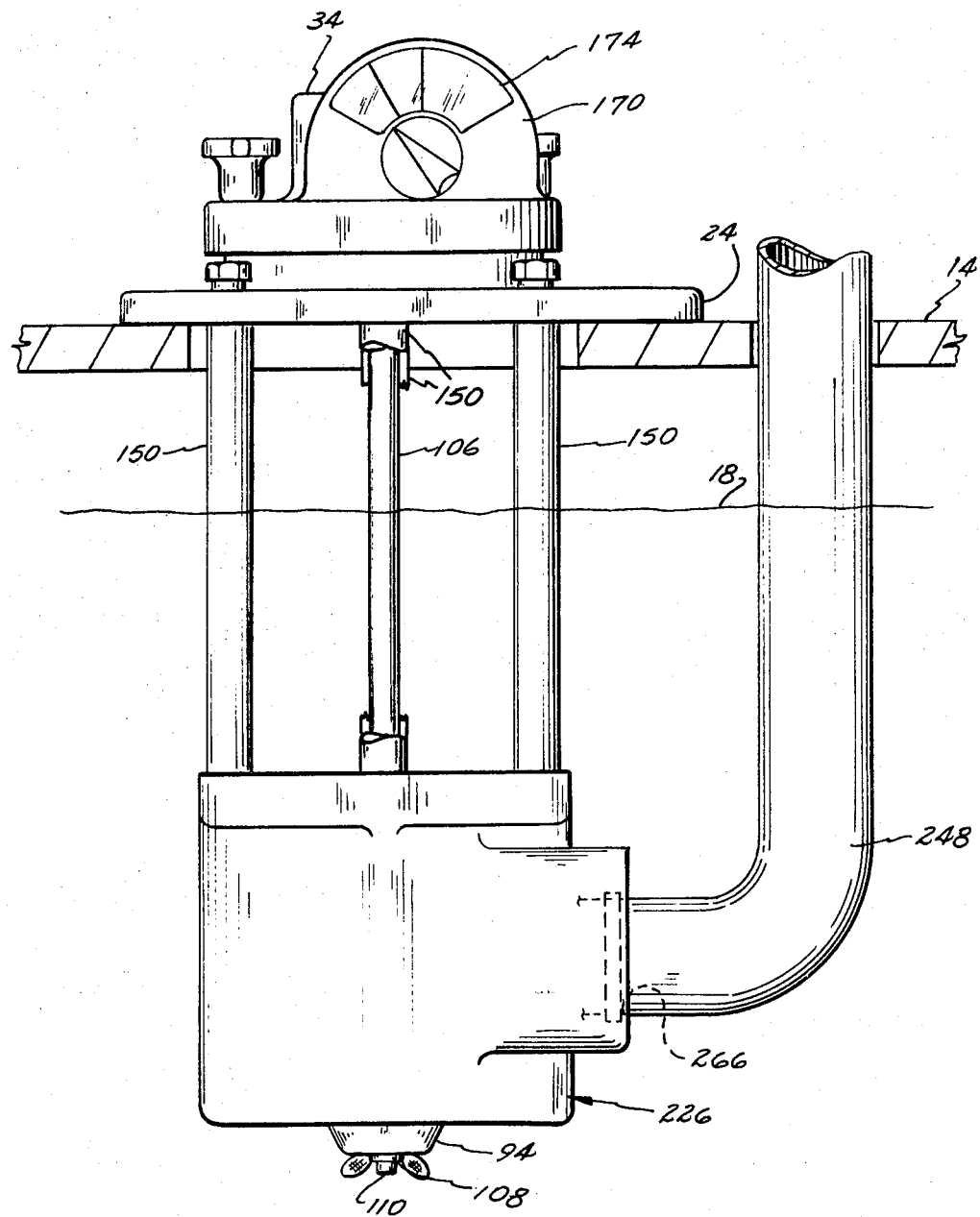
FIG. 4 is an elevational view illustrating another preferred embodiment of the present invention.

FIG. 4 illustrates a preferred modification of the device shown in FIGS. 1–3. The only difference is that a modified lower housing 226 is utilized and is provided with an outlet port 266 formed on a horizontal axis and adapted to receive a conventional outlet pipe 248 which replaces the tubular member 48. In all other respects the embodiment of FIG. 4 is identical to the filtering device described with reference to FIGS. 1–3.

It can thus be seen that the present invention has provided a filtering device having an upper housing and a lower housing which are attached to one another by a plurality of downwardly extending, removable, and interchangeable support rods which, in addition to securing the lower housing to the upper housing, provide a means for securing the tubular member connecting the upper and lower housing outlet passages.

This construction not only reduces the cost of providing such filter devices but also provides a device in which different size reservoirs can be readily accommodated.

Although several embodiments of the present invention have been described, it should be apparent to those skilled in the art of fluid devices that other changes may be had without departing from the spirit of the invention or from the scope of the appended claims.

What is claimed is as follows:

1. A filtering device comprising:
   a first housing mounted to the top of a fluid reservoir;
   a second housing disposed within said fluid reservoir below the level of fluid therein and spaced below said first housing a predetermined distance, said second housing forming a chamber having an opening at the top and bottom thereof to provide an inlet means for connecting the interior of said chamber with said fluid reservoir, said second housing having an outlet passage communicating with said chamber;
   a plurality of support rods extending downwardly from the bottom of said first housing for connection with said second housing to support said second housing at said predetermined distance from said first housing means;
   a filter element in said chamber for filtering fluid flowing from said inlet means to said outlet passage in said second housing,
   said support rods being removably attached to said first and second housings and being interchangeable with like support rods having different length,
   a tubular member connected with said outlet passage and extending upwardly to the top of said reservoir;
   an outlet passage formed in said first housing and wherein said first and second housing outlet passages each comprises a boss with an internal passage adapted to respectively sealingly receive the opposite ends of said tubular member, said tubular member being secured within said internal passages when said support rods are connected to said second housing;
   said tubular member being removably attached to said first and second housing bosses and interchangeable with like tubular members of different lengths, whereby upon providing support rods and said tubular member of appropriate lengths said predetermined distance between said first and said second housing may be varied to accommodate reservoirs of different sizes.

2. A filtering device comprising:
   a first housing mounted to the top of a fluid reservoir;
   a second housing disposed within said fluid reservoir below the level of fluid therein and spaced below said first housing a predetermined distance, said second housing forming a chamber having an opening at the top and bottom thereof to provide an inlet means for connecting the interior of said chamber with said fluid reservoir, said second housing having an outlet passage communicating with said chamber;
   a plurality of support rods extending downwardly from the bottom of said first housing for connection with said second housing to support said second housing at said predetermined distance from said first housing means;
   a filter element in said chamber for filtering fluid flowing from said inlet means to said outlet passage in said second housing,
   said support rods being removably attached to said first and second housings and being interchangeable with like support rods having different length,
   a tubular member connected with said outlet passage and extending upwardly through the top of said reservoir;
   said tubular member being axially slidably movable with respect to the top of said reservoir, whereby providing support rods of different lengths said predetermined distance between said first and said second housing may be varied to accommodate reservoirs of different sizes.

3. The filtering device as defined in claim 2 and further comprising means for moving said filter element in response to a predetermined change in the filtering condition of said filter element so as to directly communicate said inlet means with said outlet passage upon said filter element reaching a predetermined clogged condition.

4. The filtering device as defined in claim 2 and including means carried by said first housing for indicating the condition of said filtering means exteriorly of said filtering device.

5. The filtering device as defined in claim 2 and in which said filtering means is removable through said second housing.

6. The filtering device as defined in claim 1 and including means carried by said first housing for indicating the condition of said filtering means exteriorly of said filtering device.

7. The filtering device as defined in claim 1 and wherein said filter element is removable through said top chamber opening, said first housing having an opening aligned with said top chamber opening, said filter element being removable from said reservoir through said first housing opening.

8. The filtering device defined in claim 1 wherein said support rods extend downwardly from said first housing parallel to said tubular member and engage the top of said second housing.

9. The filtering device defined in claim 1 wherein each of said support rods has a threaded portion adapted to engage a threaded bore in the upper surface of said second housing to support said second housing at said predetermined distance from said first housing.

10. The filtering device as defined in claim 1 and wherein said second housing has means for removably mounting said filter element through said top chamber opening, said first housing having an opening adjacent to said first housing boss and aligned with said top chamber opening, said filter element being capable of being withdrawn from said reservoir through said first housing opening.

11. The filtering device as defined in claim 1 and wherein each of said support rod members has a threaded portion adapted to threadedly engage the upper surface of said second housing to support same at said predetermined distance from said first housing.

12. The filtering device as defined in claim 1 and further comprising means for moving said filter element in response to a predetermined change in the filtering condition of said filter element so as to directly communicate said inlet means with said outlet passage upon said filter element reaching a predetermined clogged condition.

13. The filtering device defined in claim 12 further comprising means carried by said first housing and operatively connected to said filter element to visually indicate externally of said reservoir the filtering condition of said filter element.

* * * * *

UNITED STATES PATENT OFFICE
CERTIFICATE OF CORRECTION

Patent No. 3,754,648        Dated Aug. 28, 1973

Inventor(s) Carl A. Brown      (RFC-1420-DR)

It is certified that error appears in the above-identified patent and that said Letters Patent are hereby corrected as shown below:

IN THE SPECIFICATION:

Col. 2, line 64, after "wall" insert --14--;

Col. 3, line 61, change "84" to --86--;

Col. 4, line 2, change "member" first occurrance to --element--;
line 4, change "95" to --97--;
line 5, change "member" first occurrance to --element--;
line 25, after "members" insert --96, 94-respectively--;
line 28, after "members" insert --94 and 96--;

Col. 5, line 35, delete "20" and insert thereinstead --portion 26--;
line 36, after "housing" insert --portion 20--;
line 40, after "reservoir" insert --16--;
line 43, after "36" insert --(FIG. 2)--;

Col. 6, line 34, after "element" insert --92--;
line 53, delete "element", second occurrance and insert thereinstead --assembly--;
line 57, after "element" insert --92--;
line 61, change "members 94 and 98" to --elements 88 and 90--;

PATENT NO. 3,754,648

Col. 8, line 36, delete "2" and insert --1--;
       line 38, change "means" to --element--;
       line 41, change "means" to --element--;
       line 43, change "1" to --2--;
       line 45, change "means" to --element--;

Col. 10, line 5, change "12" to --1--.

Signed and sealed this 18th day of December 1973.

(SEAL)
Attest:

EDWARD M. FLETCHER, JR.
Attesting Officer

RENE D. TEGTMEYER
Acting Commissioner of Patents